D. H. COX.

CAP FOR VALVE TUBES.

APPLICATION FILED APR. 11, 1922.

Reissued May 23, 1922. 15,359.

Inventor
David H. Cox,

By

Attorney

UNITED STATES PATENT OFFICE.

DAVID H. COX, OF ROSELLE, NEW JERSEY.

CAP FOR VALVE TUBES.

15,359. Specification of Reissued Letters Patent. Reissued May 23, 1922.

Original No. 1,392,746, dated October 4, 1921, Serial No. 456,073, filed March 28, 1921. Application for reissue filed April 11, 1922. Serial No. 551,661.

*To all whom it may concern:*

Be it known that I, DAVID H. COX, a citizen of the United States, residing at Roselle, in the county of Union and State of New Jersey, have invented a new and useful Improvement in Caps for Valve Tubes, of which the following is a specification.

The object of the invention is to provide a simple and inexpensive emergency cap or closure for use in excluding dust and dirt from valve tubes such as are universally employed in connection with pneumatic tires for vehicle wheels, and for effectually preventing the leakage of air from the tubes in the event that the valves are insecurely seated.

It is a matter of more or less common experience that the caps ordinarily employed for valve tubes become loosened and displaced, and hence lost by the jarring or vibration of the vehicle wheels, or are misplaced when they are removed to replace a tire or to inflate the same, and it is the primary purpose of the invention to provide a substitute which can be placed on the market at a low cost and of which several may be kept for emergency in the tool kit for use when required; and furthermore it is an object to provide a device for the purpose indicated which is adapted to effectually engage and accurately fit, any valve tube and to adapt itself to any peculiarity of the thread of the tube so as to constitute an effectual means for excluding dust and retaining pressure in the tube.

With these and related objects in view the invention consists in a construction and combination of parts of which a preferred form is shown in the accompanying drawing wherein.

Figure 1:
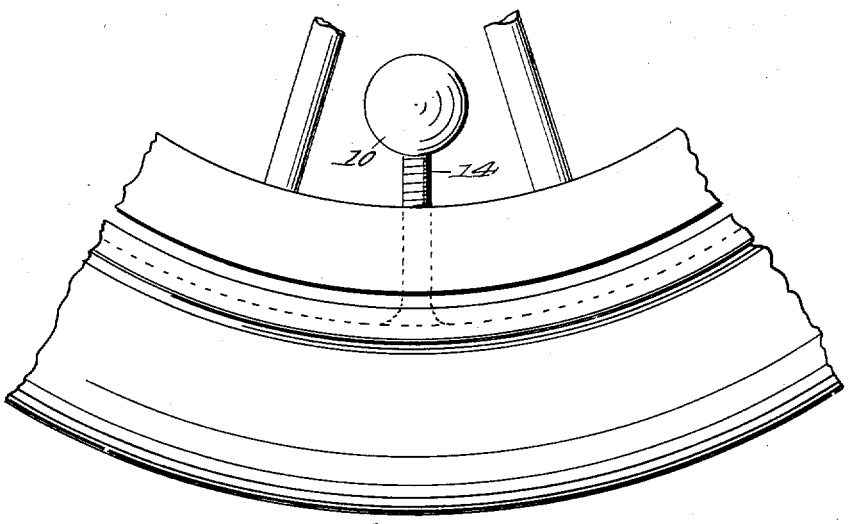
Figure 1 is a view of the cap applied to a valve tube.
Figure 2:
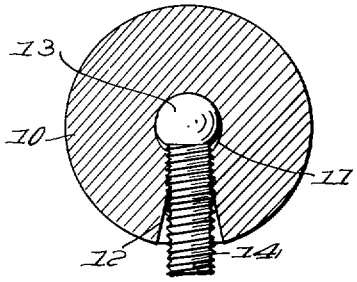
Fig. 2 is a section of the same.
Figure 3:
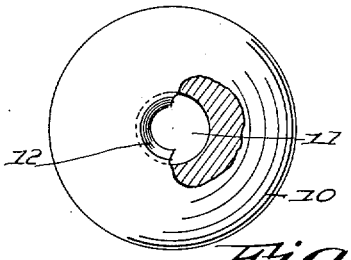
Fig. 3 is an inner side view, partly broken away.
Figure 4:
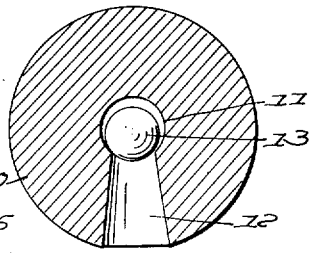
Fig. 4 is a section of the cap before it is applied to the tube.

The cap is preferably constructed of wood, or like material which is relatively soft and cheap, and is also conveniently made in a generally spherical form, with the body 10 provided with a central seat 11 which is accessible through a radial bore or channel 12.

The seat may be spherical, as shown, or of any other form which may be readily produced by a counter boring tool inserted through the radial bore or channel, and is of slightly larger diameter than the inner end of the bore, so that an elastic or compressible cushion or ball 13, of rubber or like material, which may be forced through the bore or channel 12 will expand in the seat and be locked against accidental displacement while free to be compressed by an object inserted through the bore.

The bore is preferably tapered from its outer toward its inner end, or is reduced in diameter inwardly, and is also preferably smooth surfaced, the outer, or inlet, end of the bore being of a diameter to readily receive the end of any commercial valve tube 14.

In applying the cap to a valve tube it is fitted thereover, and while being held firmly is turned in the direction of the head of the thread on the tube, thereby causing the thread of the tube to cut a complemental thread in the bore of the cap until the end of the tube is firmly and compressively seated upon the elastic cushion or ball, which is free to turn in its seat and therefore may be held by the tube as the cap is further rotated to secure a firm engagement.

A cap so constructed may be removed and replaced repeatedly and will serve indefinitely as an effective substitute for the ordinary cap, and in practice will be found of special utility in view of the fact that mutilation of the thread of the valve tube will not detract from the efficiency of the cap or prevent it from acting to exclude dust and prevent all leakage of air pressure through the tube. It will perform its designated function even when the valve tube is mutilated and distorted to such an extent as to render the ordinary tube cap utterly useless.

Figure 5:
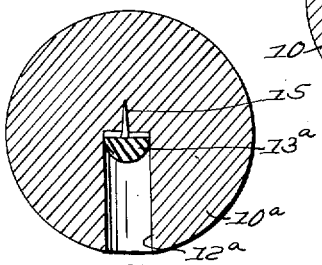
Figs. 5 and 6 show modifications of the cap.
Figure 6:
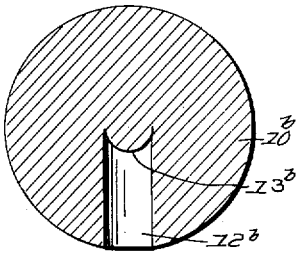

In Fig. 5 the cushion $13^a$ is of plain convex form held in place by a spur shank or tack 15, engaging the body $10^a$, and in Fig. 6 the cushion $13^b$ is integral with the body $10^b$ of the cap.

What is claimed:

1. A cap for tire valve tubes constructed of a material having a lower coefficient of hardness than the tube and provided with a smooth surfaced bore provided at its inner end with a yielding cushion to form a seat for the end of a valve tube.

2. A cap for tire valve tubes constructed of a material having a lower coefficient of hardness than the tube and provided with a smooth surfaced bore provided at its inner end with a yielding cushion to form a seat for the end of a valve tube, the bore being inwardly tapered.

3. A cap for tire valve tubes constructed of a material having a lower coefficient of hardness than the tube and provided with a smooth surfaced bore provided at its inner end with a yielding cushion to form a seat for the end of a valve tube, the bore being inwardly tapered and the cushion being fitted in a counter bored seat.

4. A cap for tire valve tubes consisting of a spherical block of wood having an inwardly tapered radial bore at the inner end of which is seated a rubber cushion.

5. A cap for tire valve tubes consisting of a spherical block of wood having an inwardly tapered radial bore at the inner end of which is seated a rubber cushion of spherical form revolubly fitted in a counterbored seat.

6. A cap for tire valve tubes having a tube receiving bore at the inner end of which is seated a rubber cushion of spherical form.

7. A cap for tire valve tubes having a tube receiving bore at the inner end of which is seated a rubber cushion of spherical form revolubly fitted in a counter-bored seat.

DAVID H. COX.